US012688948B2

(12) United States Patent
Deshmukh et al.

(10) Patent No.: US 12,688,948 B2
(45) Date of Patent: Jul. 21, 2026

(54) DIELECTRIC BODY FOR AN ELECTRICAL COMPONENT

(71) Applicant: TE Connectivity Solutions GmbH, Schaffhausen (CH)

(72) Inventors: Shruti Deshmukh, Fremont, CA (US); Jason Thomas Chiota, Fremont, CA (US); David Patrick Orris, Middletown, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 239 days.

(21) Appl. No.: 18/409,964

(22) Filed: Jan. 11, 2024

(65) Prior Publication Data

US 2025/0232892 A1 Jul. 17, 2025

(51) Int. Cl.
*H01B 3/47* (2006.01)
*H01B 13/14* (2006.01)
*H01B 17/36* (2006.01)

(52) U.S. Cl.
CPC ............... *H01B 3/47* (2013.01); *H01B 13/14* (2013.01); *H01B 17/36* (2013.01)

(58) Field of Classification Search
None
See application file for complete search history.

(56) References Cited

U.S. PATENT DOCUMENTS

| | | | | | |
|---|---|---|---|---|---|
| 2,912,382 | A * | 11/1959 | Liao | H01B 3/16 427/116 |
| 4,302,501 | A * | 11/1981 | Nagashima | B32B 21/02 428/209 |
| 5,670,250 | A * | 9/1997 | Sanville, Jr. | C08J 5/249 428/209 |
| 6,359,232 | B1 * | 3/2002 | Markovitz | H01B 3/04 174/209 |
| 7,906,730 | B2 * | 3/2011 | Atkinson | H01R 13/6474 174/78 |
| 9,492,992 | B2 * | 11/2016 | Grove-Nielsen | B29C 70/547 |
| 2009/0173515 | A1 * | 7/2009 | Sjoberg | H01B 17/32 174/12 BH |
| 2011/0315428 | A1 * | 12/2011 | Yoshitomo | C08J 5/046 174/124 R |
| 2013/0014971 | A1 * | 1/2013 | Muto | H01B 7/2813 174/110 SR |
| 2016/0055940 | A1 * | 2/2016 | Oya | H01B 13/065 174/110 SR |

* cited by examiner

*Primary Examiner* — Krystal Robinson

(57) ABSTRACT

A method of assembling an electrical component is provided. The method includes providing a dielectric body configured to support an electrical conductor. The dielectric body includes a polymer resin. The dielectric body includes glass filler elements embedded in the polymer resin, and the dielectric body includes gas cells embedded in the polymer resin.

22 Claims, 4 Drawing Sheets

DIELECTRIC BODY FOR AN ELECTRICAL COMPONENT

BACKGROUND OF THE INVENTION

The subject matter herein relates generally to low dielectric thermoplastic compositions.

High speed communication devices, such as electrical connectors, input/output modules, backplanes, and the like, are used in high-speed communication networks. High-performance polymer materials with low dielectric constant and low dielectric loss have been widely used in components of high-speed communication networks. In high-speed communication network applications, unsatisfactory dielectric properties are a barrier to signal throughput for the components. Dielectric materials having low dielectric constants are used in high-speed communication networks to improve the overall performance of the devices due to their lower dielectric constant than traditional dielectric materials, which allows for faster signal transmission. However, low dielectric constant materials are expensive and have limits to use in high-speed communication devices.

A need remains for reliable and cost-effective dielectric material for use in high-speed communication devices.

BRIEF DESCRIPTION OF THE INVENTION

In one embodiment, a method of assembling an electrical component is provided. The method includes providing a dielectric body configured to support an electrical conductor. The dielectric body includes a polymer resin. The dielectric body includes glass filler elements embedded in the polymer resin, and the dielectric body includes gas cells embedded in the polymer resin.

In another embodiment, a dielectric body for an electrical component is provided. The dielectric body includes a polymer resin. The dielectric body includes glass filler elements embedded in the polymer resin. The dielectric body includes gas cells embedded in the polymer resin between the glass filler elements.

In a further embodiment, an electrical component is provided and includes a substrate which includes a dielectric body. The dielectric body includes a polymer resin. The dielectric body includes glass filler elements embedded in the polymer resin, and the dielectric body includes gas cells embedded in the polymer resin. The electrical component includes an electrical conductor held by the substrate and at least partially surrounded by the dielectric body.

DETAILED DESCRIPTION OF THE INVENTION

Figure 1:
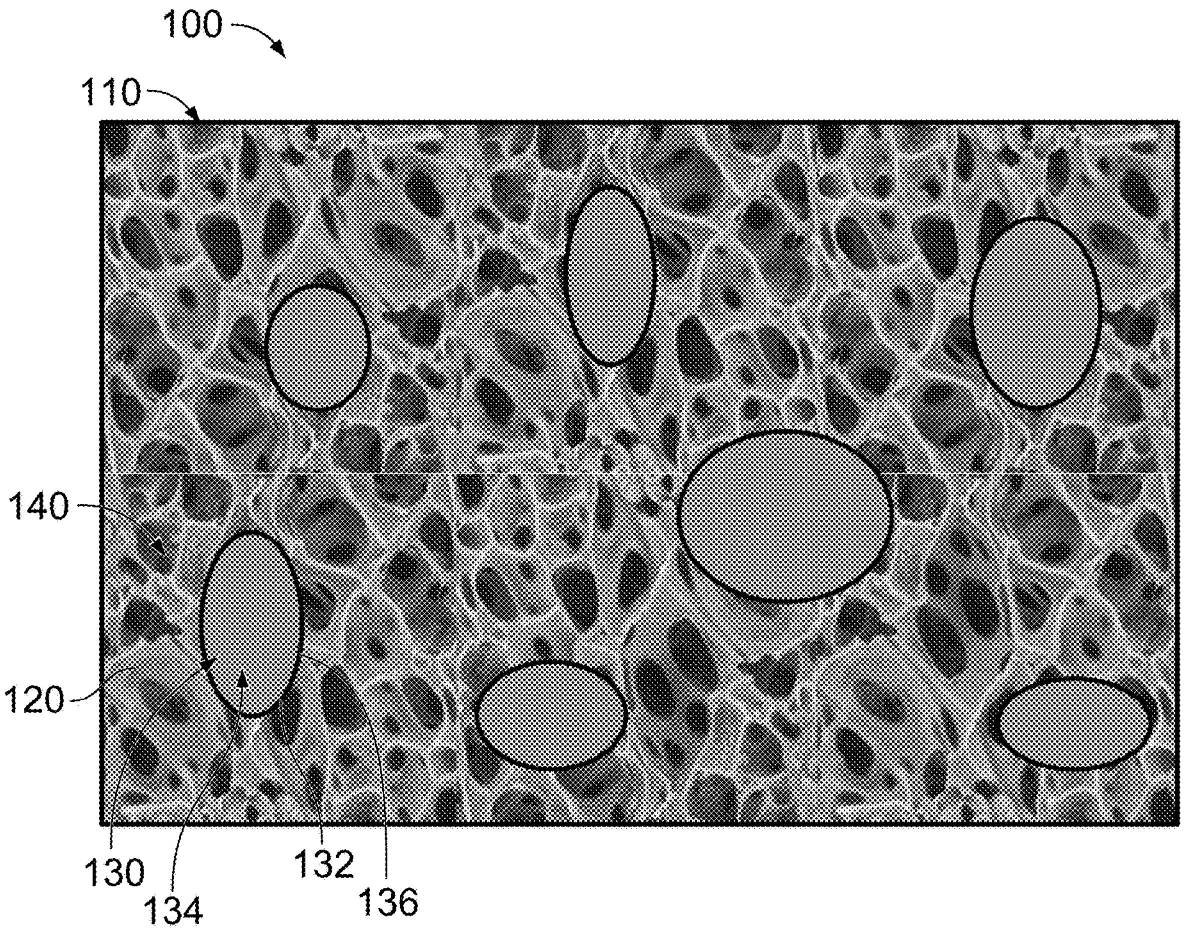
FIG. 1 illustrates a substrate in accordance with an exemplary embodiment.

FIG. 1 illustrates a substrate 100 in accordance with an exemplary embodiment. The substrate 100 includes a dielectric body 110 manufactured from a dielectric material having a low dielectric constant (low-k: k≤2.5). In an exemplary embodiment, the dielectric body 110 has a dielectric constant less than 2.0. In an exemplary embodiment, the dielectric body 110 has a dielectric constant less than 1.7. In an exemplary embodiment, the dielectric body 110 has a dielectric constant less than 1.5. The substrate 100 may be used as part of an electrical component, such as a high-speed communication device for a high-speed communication network. The substrate 100 may hold one or more electrical conductors, such as contacts, terminals, wires, traces, or other types of electrical conductors.

The dielectric body 110 includes a polymer resin 120. The dielectric body 110 includes glass filler elements 130 embedded in the polymer resin 120. The dielectric body 110 includes gas cells 140 embedded in the polymer resin 120. The glass filler elements 130 are included in the dielectric body 110 to lower the dielectric constant of the dielectric body 110 compared to having the dielectric body 110 being comprised of solely the polymer resin 120. The gas cells 140 are included in the dielectric body 110 to lower the dielectric constant of the dielectric body 110 compared to having the dielectric body 110 being comprised of solely the polymer resin 120. The gas cells 140 are included in the dielectric body 110 to lower the dielectric constant of the dielectric body 110 compared to having the dielectric body 110 being comprised of only the polymer resin 120 and the glass filler elements 130. In an exemplary embodiment, the dielectric body 110 is manufactured by processes configured to provide a two-stage dielectric constant reduction. For example, the manufacturing process includes a first stage reduction from embedding the glass filler elements 130 in the polymer resin 120. The manufacturing process includes a second stage reduction from embedding the gas cells 140 in the polymer resin 120.

The polymer resin 120 is a polymer material. The polymer resin 120 is selected based on characteristics of the polymer material, including the dielectric constant of the polymer material. In an exemplary embodiment, the polymer resin 120 is a low dielectric constant material, such as a material having a dielectric constant less than or equal to 2.5. In various embodiments, the polymer resin 120 is a liquid crystal polymer (LCP) material. The polymer resin 120 may be a polyimide material. The polymer resin 120 may be a polymer nanoparticle (PNP) material. The polymer resin 120 may be a fluoropolymer material. In various embodiments, the polymer resin 120 may be a polytetrafluoroethylene (PTFE) material. The polymer resin 120 may be a polyolefin material. The polymer resin 120 may be a polymethyl pentene (PMP) material. The polymer resin 120 may be a poly benzoxazole material. The polymer resin 120 may be a poly aryl ether material. In an exemplary embodiment, the polymer resin 120 is manufactured by an extrusion process. For example, the polymer material may be molten and extruded. The glass filler elements 130 may be added during a compounding process. The glass filler elements 130 may be added during the extrusion process in the molten polymer material. The gas cells 140 may be added during a molding process. The gas cells 140 may be formed during the extrusion process in the molten polymer material.

The glass filler elements 130 are injected, mixed, compounded, or otherwise embedded in the polymer resin 120 to lower the dielectric constant of the dielectric body 110. In an exemplary embodiment, the glass filler elements 130 have a lower dielectric constant than the material of the polymer resin to effectively lower the dielectric constant of the dielectric body 110. For example, the glass filler elements 130 may be filled with gas, such as air, to lower the dielectric constant. The glass filler elements 130 occupy some of the volume of the dielectric body 110, such as greater than 5% of the volume of the dielectric body 110 to lower the dielectric constant of the dielectric body 110. In various embodiments, the glass filler elements 130 occupy greater than 20% of the volume of the dielectric body 110 to lower the dielectric constant of the dielectric body 110. In various embodiments, the glass filler elements 130 occupy greater than 50% of the volume of the dielectric body 110 to lower the dielectric constant of the dielectric body 110. The amount of glass filler elements 130 may be selected to occupy between 0% and 75% of the volume of the dielectric body 110.

In an exemplary embodiment, the glass filler elements 130 are gas filled glass filler elements having an outer structure 132 surrounding and enclosing an interior 134, which is filled with gas, such as air. The outer structure 132 has one or more exterior surfaces 136. The polymer resin 120 and/or the gas cells 140 surrounds the glass filler elements 130 at the exterior surfaces 136. In various embodiments, glass filler elements 130 are glass bubbles. In other embodiments, the glass filler elements 130 are glass flakes or glass fibers. In alternative embodiments, the glass filler elements 130 are aerogel particles. Other types of fillers may be used in alternative embodiments, such as aerogels, expancels, hollow silica, and the like, to lower the dielectric constant of the dielectric body 110.

In an exemplary embodiment, the glass filler elements 130 are generally uniformly dispersed within the polymer resin 120. The glass filler elements 130 may be spaced apart from each other within the polymer resin 120. For example, the polymer resin 120 may be located between the glass filler elements 130. The gas cells 140 may be located between the glass filler elements 130, such as unattached from the glass filler elements 130 in the polymer resin 120. The glass filler elements 130 may have non-uniform shapes and/or sizes. In alternative embodiments, the glass filler elements 130 may have uniform shapes and/or sizes.

In an exemplary embodiment, the polymer material of the dielectric body 110 is a porous polymer material. For example, pores or voids are introduced into the polymer resin 120 to lower the dielectric constant of the dielectric body 110. In an exemplary embodiment, the gas cells 140 are created by a foaming process during manufacture of the dielectric body 110. The gas cells 140 create voids or pores in the dielectric body 110 to lower the dielectric constant of the dielectric body 110. For example, the gas cells 140 may allow air to fill a portion of the volume of the dielectric body 110 to lower the dielectric constant of the dielectric body 110. In various embodiments, the gas cells 140 occupy greater than 5% of the volume of the dielectric body 110 to lower the dielectric constant of the dielectric body 110. In various embodiments, the gas cells 140 occupy greater than 10% of the volume of the dielectric body 110 to lower the dielectric constant of the dielectric body 110. The amount of gas cells 140 may be selected to occupy between 0% and 15% of the volume of the dielectric body 110. The amount of gas cells 140 may be selected to occupy a high percentage of the volume of the dielectric body 110, such as greater than 50%. In some examples, the amount of gas cells 140 may be selected to occupy approximately 95% of the volume of the dielectric body 110. The amount of gas cells 140 added may be dependent on the process for adding the gas cells 140. For example, the gas cells 140 may be added by a foaming process during injection molding and the gas cells 140 may occupy up to 30% volume. The gas cells 140 may be added by a foaming process during extrusion and the gas cells may occupy as high as 95%-98% (such as for Styrofoam).

In an exemplary embodiment, the gas cells 140 are introduced by a foaming process into the extruded or molten polymer resin 120. For example, a chemical foaming agent may be introduced into the polymer resin 120 to create the gas cells 140. The chemical foaming agent is activated at a predetermined temperature (activation temperature), such as by the introduction of heat during the extrusion process, to create the gas cells 140. The chemical agent may be introduced as a resin, powder or liquid into the polymer resin 120. The chemical agent may be used in a concentrated resin masterbatch. In alternative embodiments, the foaming process may be a physical forming process by physically adding gas or air bubbles into the polymer resin 120 to create the gas cells 140. The foaming process increases the volume of the dielectric body 110 per unit size by introducing air or other gas into the dielectric body to ultimately lower the dielectric constant of the dielectric body 110. In various embodiments, a nucleating agent may be used to control formation of the gas cells 140 in the polymer resin 120.

In an exemplary embodiment, the two-stage dielectric constant reduction by introducing both glass filler elements 130 and the gas cells 140 in the polymer resin 120 may reduce the dielectric constant in the dielectric body 110 by at least 10%. The two-stage dielectric constant reduction by introducing both glass filler elements 130 and the gas cells 140 in the polymer resin 120 may reduce the dielectric constant in the dielectric body 110 by 20% or more in some embodiments. The two-stage dielectric constant reduction allows the use of polymer resin material having a higher starting dielectric constant, which may allow the use of less expensive polymer resin material as the starting material, but use both the glass filler elements 130 and the gas cells 140 to lower the dielectric constant to a target level for use in high-speed electrical components. For example, the low dielectric constant of the dielectric body in the dielectric body 110 has low dielectric loss to meet dielectric performance requirements for signal transmission at high speeds, such as at speeds of 224 G or higher. In various embodiments, the first stage reduction from embedding the glass filler elements 130 in the polymer resin 120 may reduce the dielectric constant by between 0.2 and 0.5 and the second stage reduction from embedding the gas cells 140 in the polymer resin 120 may reduce the dielectric constant by between 0.2 and 0.5, leading to a total dielectric constant reduction of between 0.4 and 1.0. For example, the polymer resin material may have a dielectric constant of approximately 2.5, whereas the first stage reduction from the glass filler elements 130 may lower the dielectric constant to 2.2 and the second stage reduction from the gas cells 140 may further lower the dielectric constant to 1.7. In other examples, the polymer resin material may have a dielectric constant of approximately 2.5, whereas the first stage reduction from the glass filler elements 130 may lower the dielectric constant to 2.0 and the second stage reduction from the gas cells 140 may further lower the dielectric constant to 1.7. The amount of reduction from the glass filler elements 130 may depend on the type of glass filler elements used, the amount of glass filler elements used by volume, the dielectric constant of the glass filler elements used, and the like. The amount of reduction from the gas cells 140 may depend on the type of process used to add the gas cells, such as the type of foaming process, the amount of foaming agent used, and the like.

In an exemplary embodiment, the glass filler elements 130 may form nucleation sites for the gas cells 140. For example, the gas cells 140 may be formed on the exterior surfaces 136 of the glass filler elements 130. The gas cells 140 may be attached to the glass filler elements 130, in addition to being located in the spaces between the glass filler elements 130. The gas cells 140 are uniformly distributed throughout the polymer resin by the glass filler elements.

Figure 2:
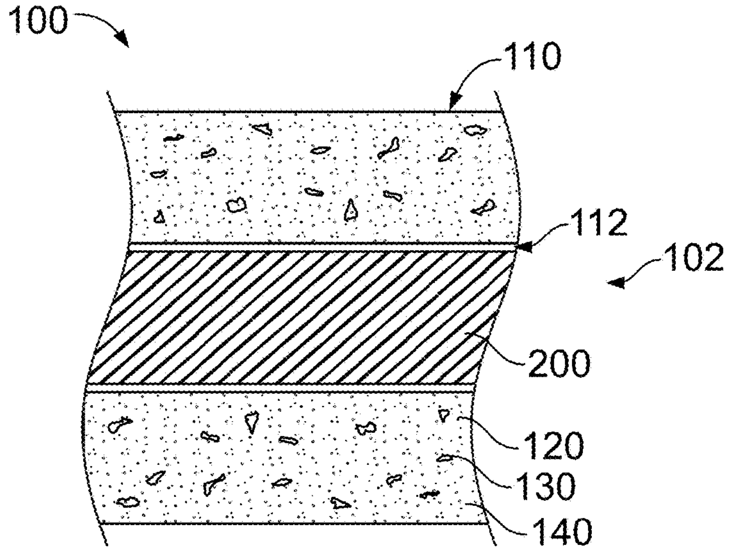
FIG. 2 illustrates an electrical component in accordance with an exemplary embodiment including the substrate formed from the dielectric body.

FIG. 2 illustrates an electrical component 102 in accordance with an exemplary embodiment including the substrate 100 formed from the dielectric body 110. FIG. 2 is a cross-sectional view of a portion of the electrical component 102. In an exemplary embodiment, the electrical component 102 includes the substrate 100 and a conductor 200 held by the substrate 100. The substrate 100 may at least partially surround the conductor 200. For example, the substrate 100 may extend along a top and/or a bottom and/or a first side and/or a second side of the conductor 200. The substrate 100 may separate the conductor 200 from other components, such as other conductors.

The substrate 100 may be extruded and/or injection molded into a predetermined shape for use with the electrical component 102. For example, the substrate 100 may be a housing, a holder, an organizer, a cover, a shield, or another component of the electrical component 102, which may be combined with other components to form an assembly. In an exemplary embodiment, the substrate 100 includes a conductor channel 112 formed in the dielectric body 110. The conductor channel 112 receives the conductor 200. The conductor 200 may be a wire, a contact, a terminal, trades, or another conductive component for transmitting electrical signals within the electrical component 102.

The substrate 100 may extend along the conductor channel 112, such as above the conductor channel 112 and/or below the conductor channel 112 and/or along a first side of the conductor channel 112 and/or along a second side of the conductor channel 112. Optionally, the substrate 100 may include multiple conductor channels 112 with the dielectric body 110 between the various conductor channels 112. The conductor channels 112 may be arranged in one or more rows along the substrate 100. In various embodiments, the conductor channel(s) 112 are preformed and the conductor(s) 200 are loaded into the conductor channels 112. In other various embodiments, the substrate 100 may be overmolded around the conductor(s) 200 to form the conductor channel(s) 112. The material of the dielectric body 110 supports and/or surrounds the conductor 200. For example, the polymer resin 120, the glass filler elements 130, and the gas cells 140 form the material of the dielectric body 110 supports and/or surrounds the conductor 200.

Figure 3:
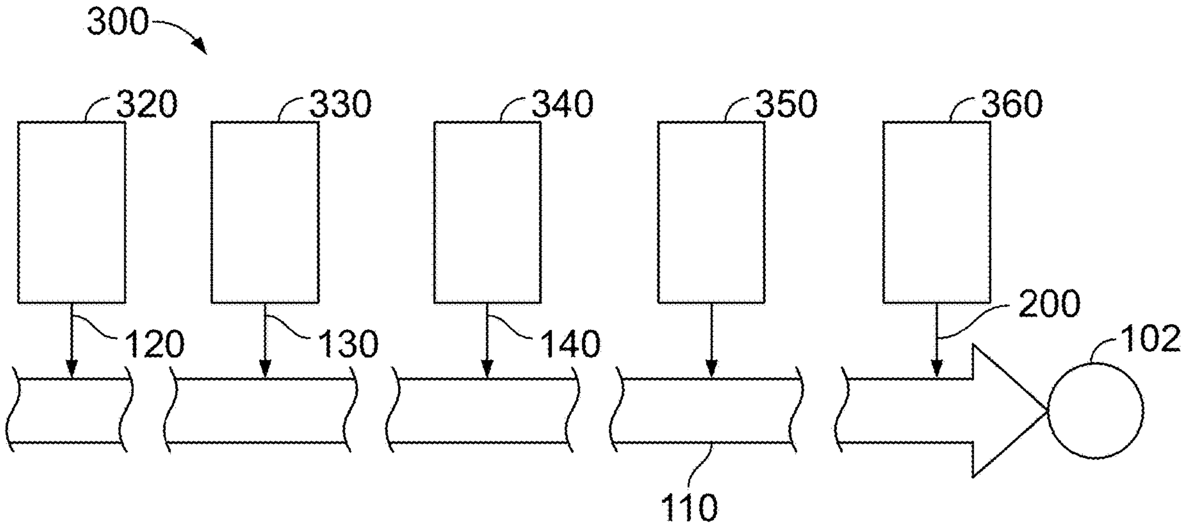
FIG. 3 illustrates a process for assembling an electrical component in accordance with an exemplary embodiment.

FIG. 3 illustrates a process for assembling an electrical component 102 in accordance with an exemplary embodiment. The process may be performed on one or more machines 300 at one or more manufacturing locations or facilities.

The process includes a first device 320 for providing a polymer resin 120. The first device 320 may be an extrusion machine for extruding the polymer resin. The first device 320 may heat the polymer resin 120 to a molten state.

The process includes a second device 330 for providing glass filler elements 130 in the polymer resin 120. The second device 330 embeds the glass filler elements 130 in the polymer resin, such as in the molten state. The second device 330 may be part of the extrusion machine. The second device 330 may inject the glass filler elements 130 into the polymer resin 120. The second device 330 may mix the glass filler elements 130 and the polymer resin 120 to uniformly distribute the glass filler elements 130 in the polymer resin 120.

The process includes a third device 340 for providing gas cells 140 in the polymer resin 120. The third device may be a polymer foaming machine or device for foaming the polymer resin 120 to form the gas cells 140. The third device 340 embeds the gas cells 140 in the polymer resin, such as in the molten state. The third device 340 may be part of the extrusion machine or the injection molding machine. The third device 340 may inject the gas cells 140 into the polymer resin 120, such as by physically adding air bubbles into the polymer resin 120. The third device 340 may inject or mix a chemical foaming agent into the polymer resin 120. The gas cells 140 may be uniformly distributed in the polymer resin 120.

The process includes a fourth device 350 for forming the dielectric body into a substrate. The fourth device 350 may be an extrusion machine for extruding the dielectric body into a predetermined shape for use in the electrical component 102. The fourth device 350 may be an injection molding machine for injection molding the dielectric body into a predetermined shape for use in the electrical component 102. The fourth device 350 may be board or card forming machine. The fourth device 350 may be used to form conductor channels in or on the substrate. Other types of forming machines may be used in alternative embodiments.

The process includes a fifth device 360 for positioning an electrical conductor 200 in or on the substrate. The electrical conductor 200 may be a wire, a contact, a terminal, a trace, or another type of electrical conductor for transmitting electrical signals. The electrical conductor 200 may be loaded into the conductor channel or the substrate. In other embodiments, the fifth device 360 may hold the electrical conductor 200, such as on a carrier strip, and the fourth device 350 may overmold the dielectric body 110 around the electrical conductor 200.

Figure 4:
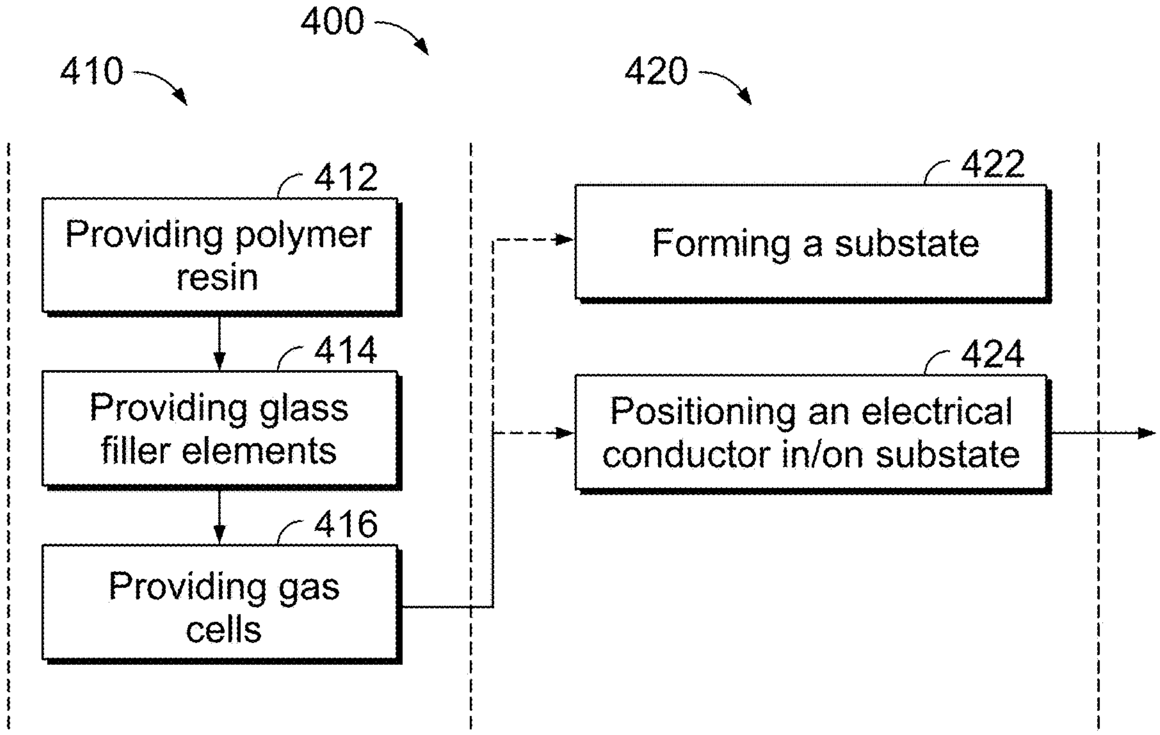
FIG. 4 is a flow chart 400 showing a method of assembling an electrical component in accordance with an exemplary embodiment.

FIG. 4 is a flow chart 400 showing a method of assembling an electrical component. The method includes one or more forming steps at 410 for forming a dielectric body. The method includes one or more assembly steps at 420 for assembling an electrical conductor with the dielectric body to provide the electrical component.

The forming steps 410 include the step of providing 412 a polymer resin. The polymer resin may be provided at an extrusion machine. The polymer resin may be a low dielectric constant polymer resin. The forming steps 410 include the step of providing 414 glass filler elements in the polymer resin. The glass filler elements may be injected, mixed, compounded, or otherwise embedded in the polymer resin. The glass filler elements may be embedded in the polymer resin when the polymer resin is in a molten state. The glass filler elements lower the dielectric constant of the dielectric body, such as by being a lower dielectric constant material and/or introducing air into the polymer resin material. The forming steps 410 include the step of providing 416 gas cells in the polymer resin. In an exemplary embodiment, the gas cells are provided by a foaming process. The gas cells may be added by a chemical foaming process or a physical foaming process. The gas cells introduce gas or air into the polymer resin material. The gas cells are formed in the polymer resin when the polymer resin is in a molten state. Optionally, the foaming process occurs after the glass filler elements are added to the polymer resin. The glass filler elements may form nucleation sites for the gas cells. For example, the gas cells may be formed on the exterior surfaces of the glass filler elements. The gas cells are uniformly distributed throughout the polymer resin by the glass filler elements. The gas cells lower the dielectric constant of the dielectric body, such as by introducing air into the polymer resin material.

The assembly steps 420 include the step of forming 422 a substrate using the dielectric body including the polymer resin, the glass filler elements, and the gas cells. The substrate may be formed into a predetermined shape, such as by an extrusion machine or an injection molding machine. The forming step 422 may include forming one or more conductor channels in the substrate. The assembly steps 420 include the step of positioning 424 an electrical conductor in or on the substrate. The electrical conductor may be a wire, a contact, a terminal, a trace or another type of electrical conductor that is located in or on the substrate. The electrical conductor is assembled with the substrate to form the electrical component.

Figure 5:
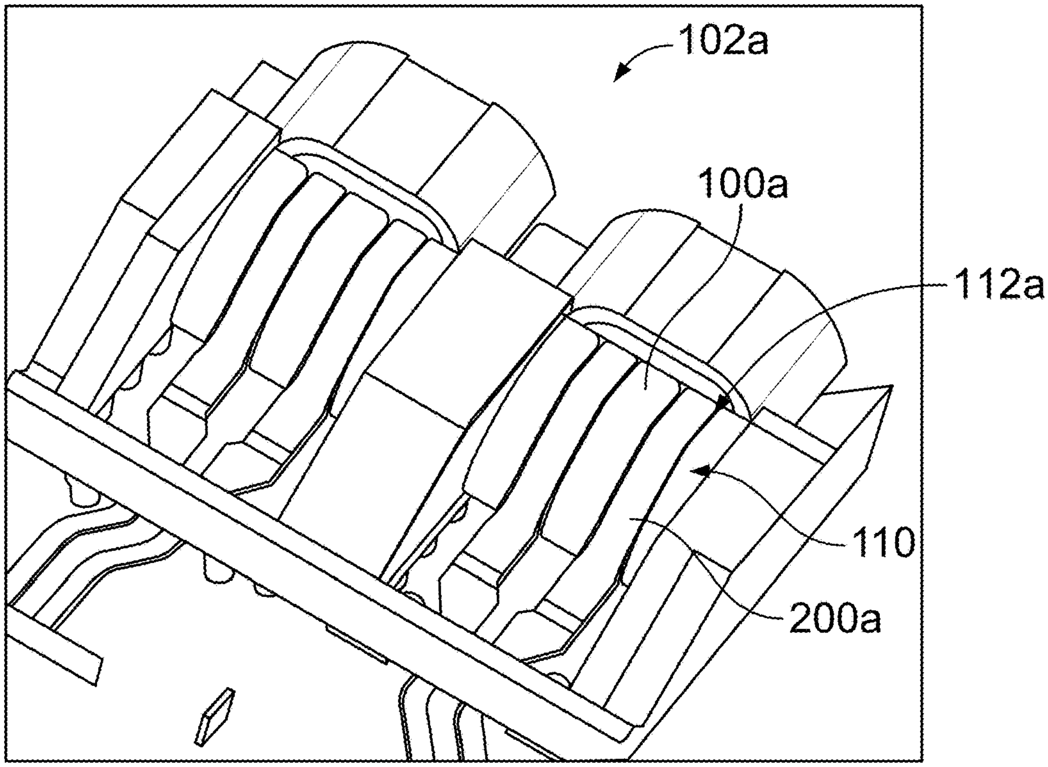
FIG. 5 is a perspective view of a portion of an electrical component in accordance with an exemplary embodiment.

FIG. 5 is a perspective view of a portion of an electrical component 102*a* in accordance with an exemplary embodiment. The electrical component 102*a* includes substrates 100*a* holding conductors 200*a*. The conductors 200*a* are wires of cables, such as twin axial cables. The substrates 100*a* are conductor holders molded into a predetermined shape to support the conductors 200*a* at the end of the cable for termination to a circuit board. The substrates 100*a* are manufactured from the dielectric body 110, including the polymer resin 120, the glass filler elements 130, and the gas cells 140 (shown in FIG. 1). The substrates 100*a* include conductor channels 112*a* that hold the conductors 200*a*. The dielectric body 110 surrounds portions of the conductors 200*a*, such as the bottom and sides of the wires to position and isolate the wires from each other and from the shield element.

Figure 6:
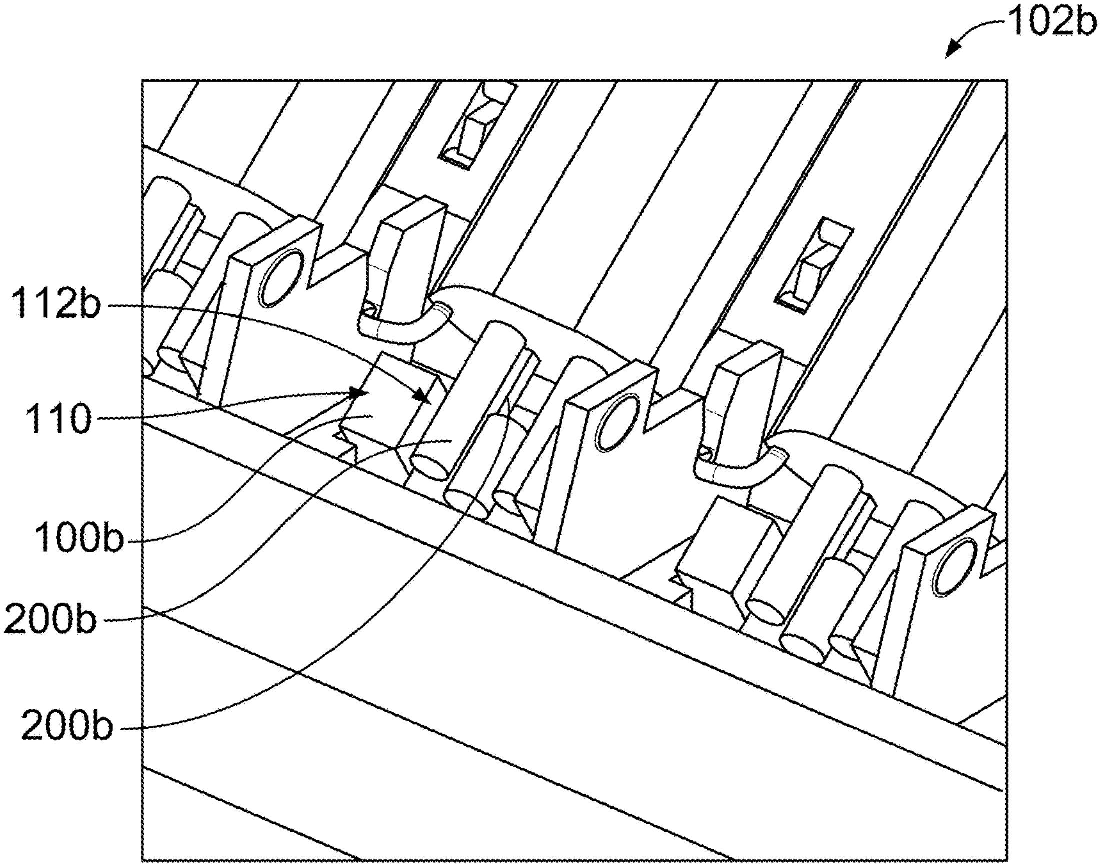
FIG. 6 is a perspective view of a portion of an electrical component in accordance with an exemplary embodiment.

FIG. 6 is a perspective view of a portion of an electrical component 102*b* in accordance with an exemplary embodiment. The electrical component 102*b* includes substrates 100*b* holding conductors 200*b*. The conductors 200*b* include contacts and wires of cables. The contacts are configured to be soldered to the wires to electrically connect the wires to a circuit board. The substrates 100*b* are conductor holders molded into a predetermined shape to support the contacts and/or the wires. The substrates 100*b* are manufactured from the dielectric body 110, including the polymer resin 120, the glass filler elements 130, and the gas cells 140 (shown in FIG. 1). The substrates 100*b* include conductor channels 112*b* that hold the conductors 200*b*. For example, the dielectric body 110 may be overmolded over the contacts and include slots or channels that receive the ends of the wires. The dielectric body 110 surrounds portions of the conductors 200*b* to position and isolate the wires from each other and from the shield element.

Figure 7:
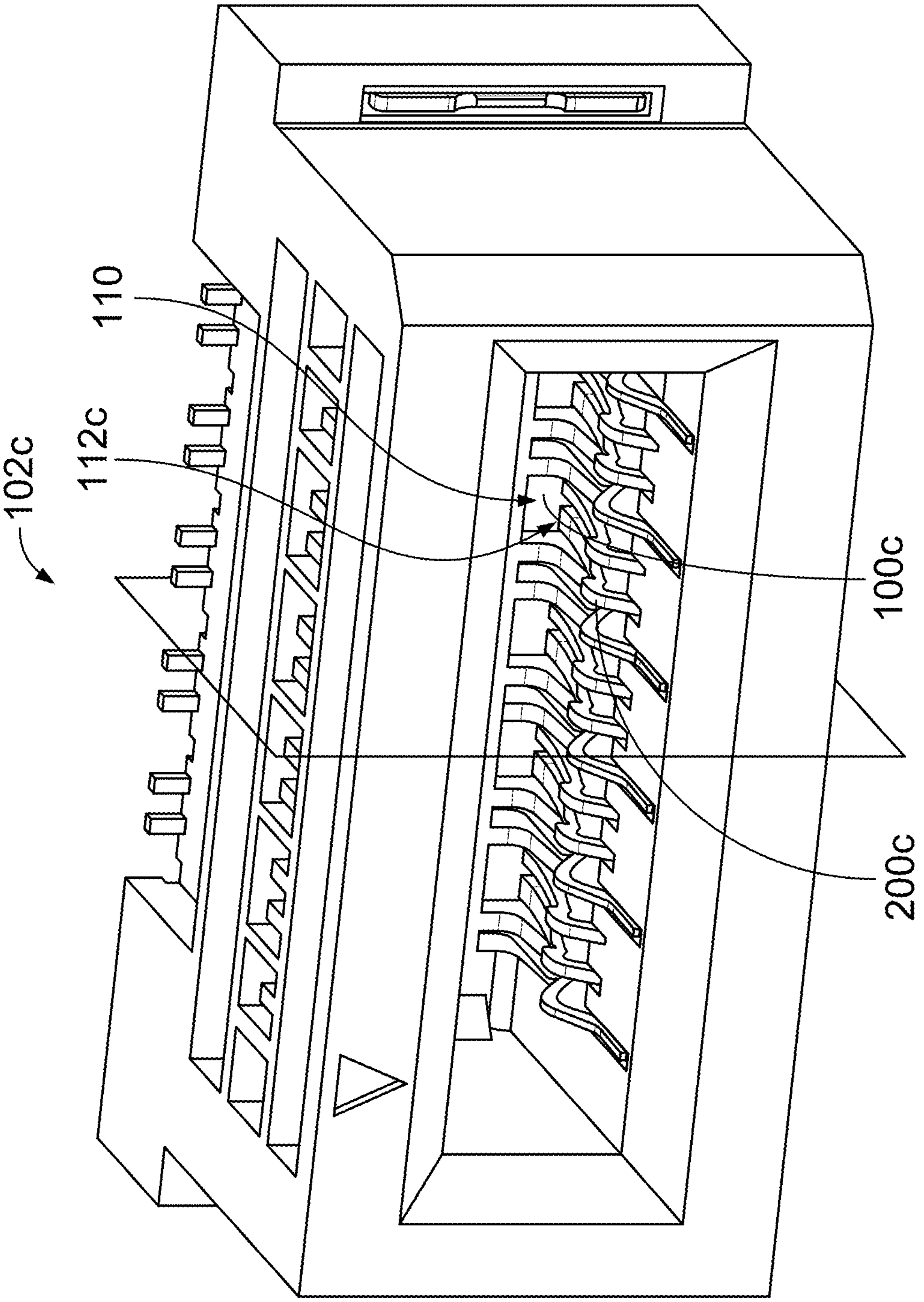
FIG. 7 is a perspective view of a portion of an electrical component in accordance with an exemplary embodiment.

FIG. 7 is a perspective view of a portion of an electrical component 102*c* in accordance with an exemplary embodiment. The electrical component 102*c* is a card edge connector. The electrical component 102*c* includes a housing and contact holders defining substrates 100*c* that hold conductors 200*c*. The conductors 200*c* are contacts configured to be terminated to a circuit board and configured to be mated to a pluggable module, such as an I/O module. The substrates 100*c* may be molded parts. For example, the substrates 100*c* may include one or more contact holders overmolded over the contacts. The substrates 100*c* may include the housing of the card edge connector. The substrates 100*c* are manufactured from the dielectric body 110, including the polymer resin 120, the glass filler elements 130, and the gas cells 140 (shown in FIG. 1). The substrates 100*c* include conductor channels 112*c* that hold the conductors 200*c*. The dielectric body 110 surrounds portions of the conductors 200*c*, such as the top, the bottom and the sides of the contacts to position and isolate the contacts from each other.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

What is claimed is:

1. A method of assembling an electrical component, the method comprising:

providing a dielectric body configured to support an electrical conductor, the dielectric body including a polymer resin, the dielectric body including glass filler elements embedded in the polymer resin, and the dielectric body including gas cells embedded in the polymer resin, wherein the dielectric body has a two-stage dielectric constant reduction with a first stage reduction from embedding the glass filler elements in the polymer resin and a second stage reduction from embedding the gas cells in the polymer resin.

2. The method of claim 1, further comprising providing the electrical conductor at least one of on or in the dielectric body.

3. The method of claim 1, wherein the glass filler elements are gas filled glass filler elements.

4. The method of claim 1, wherein the gas cells attach to the glass filler elements in the polymer resin.

5. The method of claim 1, wherein the glass filler elements form nucleation sites for the gas cells to evenly distribute the gas cells throughout the polymer resin.

6. The method of claim 1, wherein the gas cells are provided in the dielectric body by a foaming process.

7. The method of claim 1, wherein the gas cells are provided in the dielectric body using a chemical foaming agent.

8. The method of claim 1, wherein the gas cells are provided in the dielectric body using a physical foaming agent.

9. The method of claim 1, wherein said providing the dielectric body comprises injection molding the dielectric body.

10. The method of claim 1, wherein said providing the dielectric body comprises extruding the dielectric body.

11. The method of claim 1, further comprising forming a conductor channel in the dielectric body.

12. The method of claim 11, further comprising positioning an electrical conductor in the conductor channel.

13. The method of claim 1, wherein the glass filler elements occupy at least 5% of a volume of the dielectric body and the gas cells occupy at least 5% of the volume of the dielectric body.

14. A dielectric body for an electrical component, the dielectric body comprising: a polymer resin; glass filler elements embedded in the polymer resin; and gas cells embedded in the polymer resin between the glass filler elements, wherein the gas cells are attached to the glass filler elements in the polymer resin.

15. The dielectric body of claim 14, wherein the glass filler elements are gas filled glass filler elements.

16. The dielectric body of claim 14, wherein the gas cells form a foamed cellular structure in the dielectric body.

17. The dielectric body of claim 14, wherein the dielectric body includes a conductor channel in the dielectric body configured to support an electrical conductor in the conductor channel.

18. The dielectric body of claim 14, wherein the glass filler elements occupying at least 5% of a volume of the dielectric body and the gas cells occupy at least 5% of the volume of the dielectric body.

19. The dielectric body of claim 14, wherein the dielectric body has a two-stage dielectric constant reduction with a first stage reduction from the glass filler elements embedded in the polymer resin and a second stage reduction from the gas cells embedded in the polymer resin.

20. The dielectric body of claim 14, wherein the glass filler elements form nucleation sites for the gas cells to evenly distribute the gas cells throughout the polymer resin.

21. An electrical component comprising:

a substrate including a dielectric body, the dielectric body including a polymer resin, the dielectric body including glass filler elements embedded in the polymer resin, and the dielectric body including gas cells embedded in the polymer resin, wherein the glass filler elements form nucleation sites for the gas cells to evenly distribute the gas cells throughout the polymer resin; and an electrical conductor held by the substrate and at least partially surrounded by the dielectric body.

22. The electrical component of claim 21, wherein the dielectric body has a two-stage dielectric constant reduction with a first stage reduction from the glass filler elements embedded in the polymer resin and a second stage reduction from the gas cells embedded in the polymer resin.

* * * * *